Sept. 24, 1940.         H. W. PRICE ET AL         2,215,716
                      CLUTCH CONTROL MECHANISM
                Original Filed Oct. 14, 1935     2 Sheets-Sheet 1

INVENTOR.
HAROLD W. PRICE
EARL R. PRICE
BY
ATTORNEY.

Sept. 24, 1940.　　　H. W. PRICE ET AL　　　2,215,716
CLUTCH CONTROL MECHANISM
Original Filed Oct. 14, 1935　　2 Sheets-Sheet 2

INVENTOR.
HAROLD W. PRICE
EARL R. PRICE
BY
ATTORNEY.

Patented Sept. 24, 1940

2,215,716

UNITED STATES PATENT OFFICE 2,215,716

CLUTCH CONTROL MECHANISM

Harold W. Price and Earl R. Price, South Bend, Ind., assignors to Bendix Products Corporation, South Bend, Ind., a corporation of Indiana Original application October 14, 1935, Serial No. 44,850. Divided and this application October 3, 1938, Serial No. 232,954

4 Claims. (Cl. 192—.01)

This invention relates in general to clutches, and more particularly to power means for operating the clutch of an automotive vehicle.

It is the principal object of the invention to provide a pressure differential operated clutch operating motor controlled by an accelerator operated line type of follow-up valve mechanism.

Yet another object is to provide a valvular control for a power clutch mechanism whereby the clutch is engaged relatively rapidly and uniformly up to the point of clutch plate contact, the remainder of the engagement being in successive relatively small increments of movement to thereby effect a slipping clutch and a smooth engagement.

A further object of the invention is to provide, in an accelerator controlled clutch operating power means, means for temporarily limiting the clutch plate loading to a predetermined maximum in the event the accelerator is opened too quickly. Thus, should the driver inadvertently or by design open the accelerator too widely, the aforementioned means will, nevertheless, obviate a too rapid or grabbing clutch engagement.

A further object of the invention is to provide an accelerator controlled automatic clutch mechanism wherein release and depression of the accelerator initiate respectively clutch disengaging and engaging operations of the mechanism, the degree of depression of the accelerator determining the rate of engagement of the clutch.

Further objects of the invention and desirable details of construction and combinations of parts will become apparent from a detailed description of certain embodiments of the invention, described in detail in the following specification, taken in conjunction with the accompanying drawings illustrating said embodiments, in which.

Figure 1:
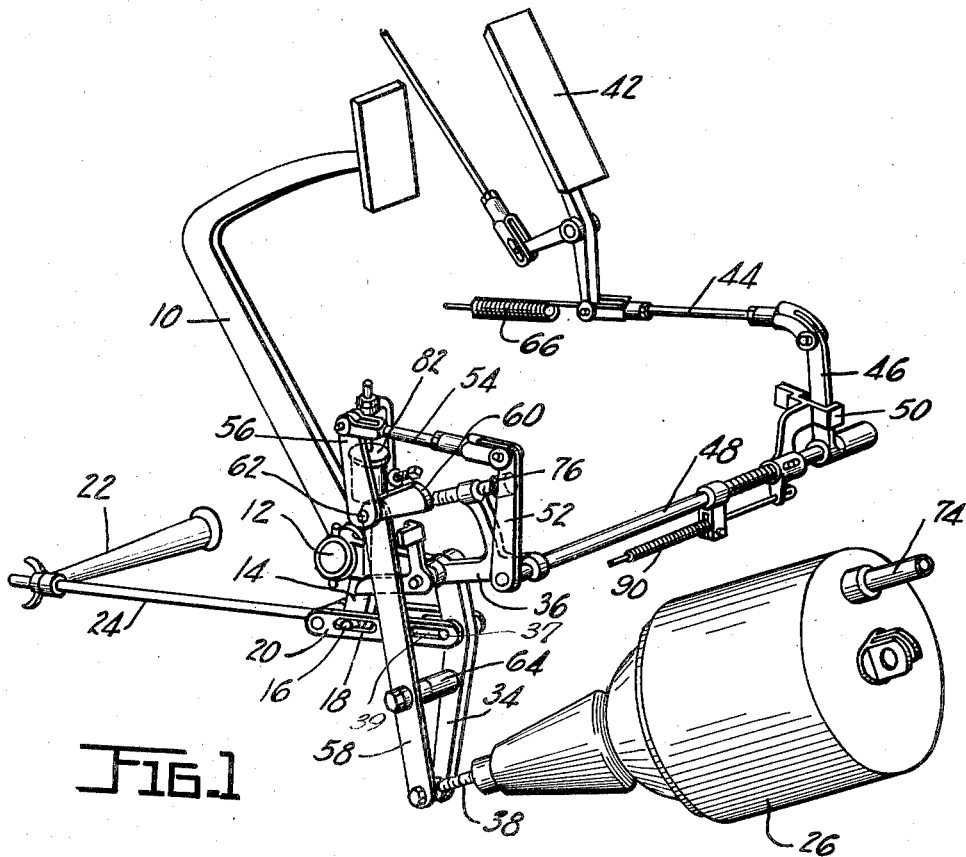
Figure 1 is a diagrammatic view of a preferred type of clutch operating power mechanism constituting our invention.

In the embodiment of the invention disclosed in Figure 1, a clutch of conventional design, not shown, is adapted to be operated by a clutch pedal lever 10 pivotally mounted upon a shaft 12 fixedly secured to the chassis. One end of a lower arm 14 of the pedal lever is provided with projections 16 fitting within a slot 18 in the yoke 20, the latter being connected to a clutch throwout arm 22 by a link 24. Such a construction makes possible a disengagement of the clutch when the clutch pedal 10 is sufficiently depressed.

Figure 2:
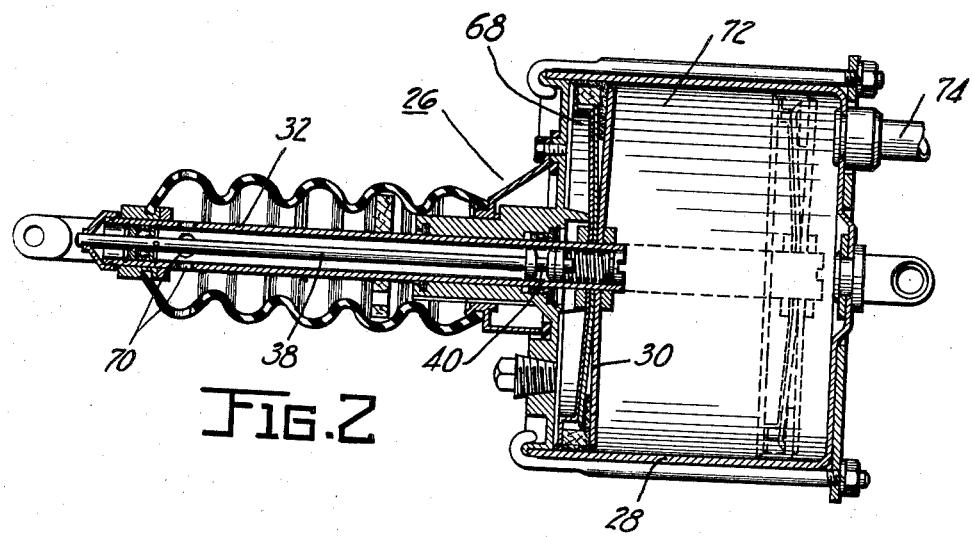
Figure 2 is a sectional view of the vacuum suspended actuator of the power mechanism of Figure 1.

The invention is particularly directed to power means for operating the clutch to thereby dispense with a manual operation thereof. To this end there is provided a pressure differential operated motor 26 of the vacuum suspended type, said motor comprising, as disclosed in Figure 2, a double-ended cylinder 28 fixed to the chassis, said cylinder housing a reciprocable piston 30. A hollow connecting rod 32 fixedly secured to the piston 30 is operably connected to the aforementioned clutch operating yoke 20 by a lever member 34, the latter having a fixed pivotal mounting upon a bracket 36 fixedly secured to the shaft 12. The lever member 34 is connected to the yoke 20 by means of a pin 37, which is secured to said member and fits within a slot 39 in the yoke. Such a construction makes possible a manual disengagement of the clutch by the clutch pedal without moving the lever member 34.

A rod 38, mounted within the hollow rod 32, is provided at one of its ends with a spool-shaped valve member 40, the other end of the rod being connected to an accelerator pedal 42 by linkage including a link 44, a crank 46 rotatably mounted upon a shaft 48, a sliding pick-up lever 50 keyed to the shaft 48, a crank 52, link 54, bellcrank lever 56, and a valve operating lever 58. The bell-crank lever 56 is curved or cammed at one of its ends 60 for a purpose to be described hereinafter and is pivotally mounted to the lever 58 at 62. A pin 64 serves to pivotally interconnect the levers 34 and 58.

Referring now to the operation of the aforementioned mechanism, upon releasing the accelerator, a spring 66 acting upon the spool-shaped valve member 40, through the intermediary of the linkage interconnecting the accelerator and valve, serves to move the member 40 to vent a compartment 68 of the motor 26 to the atmosphere via openings 70 in the rod 32. A remaining compartment 72 of the motor is permanently connected to the intake manifold of the internal-combustion engine via a conduit 74. The motor 26 is thus energized, the differential of pressures acting upon the piston 30 serving to move the same to the dotted line position disclosed in Figure 2 to disengage the clutch.

Upon depressing the accelerator, the lever 56 is moved until the cam portion 60 thereof contacts a stop 76 fixed to the bracket 36, the lever members 56 and 58 moving as a unit. The valve 40 is thus moved to cut off the connection between the atmosphere and the compartment 68 and to interconnect said compartment with the partially evacuated compartment 72. The clutch spring then acts to reengage the clutch, the piston 30 moving to lap the valve mechanism and hold the clutch engaged at a point where the plates are about to contact one with another, the cam 60 and stop 76 being adjusted to effect this result. The accelerator is then further depressed, whereby the relatively movable pivotally connected levers 56 and 58, aided by the stop 76, act to again crack the valve a relatively small amount. The subsequent follow-up to-lap action of the valve mechanism insures a relatively small increment of engaging movement of the clutch. Subsequent throttle opening movements of the accelerator serve to progressively engage and clutch step-by-step to thus effect a slipping clutch and a maneuvering control of the vehicle.

Figure 3:
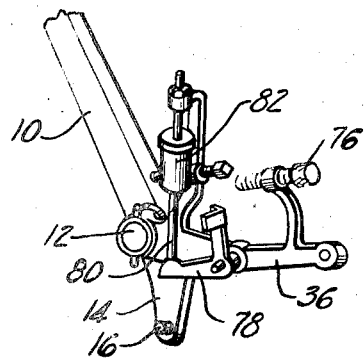
Figures 3 and 4 are views disclosing separate forms of dashpot mechanism acting as adjuncts to the mechanism of Figure 1.

Should the driver, either inadvertently or by design, tramp hard upon the accelerator, the valve lever 58 contacts an angular-shaped pick-up lever 78, Figure 3, one arm of which contacts a plunger 80 of a dashpot mechanism 82. Thus the lever 58 is limited as to its rate of movement and the clutch may not be engaged too quickly, a grabbing clutch being thus avoided.

Figure 4:
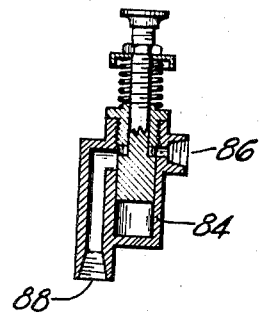

If desired, a dashpot cylinder 84 may be connected, as disclosed in Figure 4, to the oil pump of the engine, a port 86 connecting the mechanism with the pump and a port 88 connecting the mechanism with the engine sump. In this construction the dashpot is controlled by the oil pressure of the engine lubricating system, and the engagement of the clutch is regulated as to speed in proportion to the speed of the engine.

The pick-up lever 50, Figure 1, may be moved out of engagement with the crank 46 by a Bowden control 90, thus rendering the power mechanism inoperative.

There is thus provided a clutch control mechanism wherein the clutch is automatically disengaged and engaged upon releasing and depressing the accelerator respectively, the engagement being in two stages of movement, the first relatively rapid and the second relatively slow, the speed of the second or slow stage being in proportion to the degree of depression of the accelerator.

The invention heretofore described is disclosed in our copending application Serial No. 44,850, filed October 14, 1935, this application constituting a division thereof.

Although this invention has been described in connection with certain specific embodiments, the principles involved are susceptible of numerous other applications that will readily occur to persons skilled in the art. The invention is, therefore, to be limited only as indicated by the scope of the appended claims.

We claim:

1. In an automotive vehicle provided with an accelerator and a clutch pedal, power means for operating the clutch comprising a pressure differential operated motor, valve means of the follow-up type for controlling said motor, and means for temporarily limiting to a predetermined degree the clutch engaging operation of said motor.

2. In an automotive vehicle provided with an accelerator and a clutch pedal, power means for operating the clutch comprising a vacuum suspended motor, valve means of the follow-up type for controlling said motor, and means for momentarily limiting to a predetermined degree the clutch engaging operation of said motor, said latter means including a dashpot operable by the force feed lubricating system of the engine and in accordance with the speed of said engine.

3. In an automotive vehicle provided with a clutch and an accelerator, power means for operating the clutch comprising a pressure differential operated motor including a cylinder and a piston, valve means for controlling said motor, linkage interconnecting said accelerator, valve means, piston and clutch, said linkage including a pair of lever members pivotally connected with each other, one of said members being pivotally connected to a portion of said valve mechanism, a rigidly mounted bracket member, a stop member secured to said bracket member in position to be contacted by one of said lever members, a dashpot, and means mounted on the bracket for interconnecting the dashpot and one of said lever members.

4. In an automotive vehicle provided with a clutch and an accelerator, power means for operating the clutch including a pressure differential operated motor operably connected with the clutch, valve means for controlling the operation of said motor, linkage interconnecting the valve, clutch, accelerator and power element of the motor, said linkage including a rod, a crank member loosely mounted on said rod, a stop member slidably mounted on said rod and contractible with said crank, and means operable by the driver for moving said stop out of engagement with said crank to thereby render said power means inoperative.

HAROLD W. PRICE.
EARL R. PRICE.